of the valency of Ar, Ar is an

United States Patent [19]
Torck et al.

[11] 3,773,689
[45] Nov. 20, 1973

[54] CATALYST FOR ALKYLATION OF AROMATIC HYDROCARBONS

[75] Inventors: Bernard Torck, Chatou; Lucien Sajus, Croissy-sur-Seine, both of France

[73] Assignee: Institut Francais Du Petrole Des Carburants Et Lubrifiants, Rueil-Malmaison, France

[22] Filed: Sept. 30, 1971

[21] Appl. No.: 185,365

[30] Foreign Application Priority Data
Sept. 30, 1970 France .............................. 7035450

[52] U.S. Cl............................................ 252/431 R
[51] Int. Cl........................................................ B01j
[58] Field of Search ................................. 252/431 R

[56] References Cited
UNITED STATES PATENTS
3,480,567  11/1969  Matsui et al. ............... 252/431 R X
3,657,158  4/1972   Vandenberg................ 252/431 R X
2,388,428  11/1945  Mavity ......................... 252/431 R X FOREIGN PATENTS OR APPLICATIONS
1,032,033  6/1966  Great Britain .................. 252/431 R

*Primary Examiner*—Helen M. S. Sneed
*Attorney*—Millen, Raptes and White

[57] ABSTRACT

Catalyst comprising a compound of formula $R\,Al\,X_2$, in which R is a monovalent hydrocarbon radical and X is an electronegative group, and a polyhydroxyaromatic compound preferably of the formula $(R')_m Ar(OH)_x$ in which x is an integer greater than 1, m is zero or an integer such that $(x+m)$ is not greater than the maximum value of the valency of Ar, Ar is an aromatic radical of valency $(x+m)$ and the m groups R' are substituents, particularly halogen atoms or hydrocarbon monovalent radicals.

5 Claims, No Drawings

CATALYST FOR ALKYLATION OF AROMATIC HYDROCARBONS

This invention relates to a new catalyst and process for alkylation of aromatic hydrocarbons. More particularly this invention relates to alkylation of aromatic hydrocarbons by means of olefins, in the presence of a catalyst system comprising, in combination, an aluminum compound such as hereinafter defined and a compound containing at least one benzene ring substituted with at least two hydroxy groups and, more particularly, the combination of an alkylaluminum dihalide and a diphenol.

It is known that most of the aromatic compounds having a benzenic or polybenzenic structure may be alkylated by olefins in the presence of "Friedel-Crafts" catalysts such as, for example, aluminum chloride or boron trifluoride. These alkylation processes, in spite of their large use, suffer from certain drawbacks. For example, aluminum chloride is only efficient in the form of a catalyst complex of aluminum chloride with a co-catalyst such as, for example, a Bronsted acid, and with hydrocarbons. This liquid catalyst complex is insoluble in benzene and its catalytic activity decreases during time. The catalyst consumption is high, the hydrocarbon loss in the form of acid muds is substantial and the continuous operation is difficult to carry out.

The dihaloalkylaluminums are known as catalysts for alkylating aromatic hydrocarbons by means of olefins. They have the advantage of being soluble in aromatic hydrocarbons which makes possible an alkylation in homogeneous phase.

According to this invention, it has been shown that compounds having two hydroxy groups linked to a benzene ring act as promoters of the catalytic activity of the dihaloalkylaluminums and equivalent aluminum compounds in the alkylation of aromatic hydrocarbons with olefins. As a matter of fact, it has been observed that the addition of diphenols, e.g to a benzenic solution of dichloroethylaluminum, considerably increases the velocity of the alkylation of benzene by means of an olefin, even at relatively low temperature. Moreover the whole mixture is kept perfectly homogeneous up to benzene conversion rates of 95 to 98 percent.

It is therefore an object of this invention to provide a soluble catalyst for alkylating an alkylatable aromatic hydrocarbon by means of an olefinic hydrocarbon or an alkyl halide, said catalyst being formed from an aluminum compound of the formula $R\,Al\,X_2$ and a polyhydroxyaromatic compound containing at least two hydroxy groups, for example of the formula $(R')_m Ar(OH)_x$, in which x is an integer not lower than 2 (preferably from 2 to 4), m is 0 or a positive integer, the sum $(x + m)$ being at most equal to the maximum valency of Ar, Ar is an aromatic radical of valency $(x + m)$ and the m groups R', which are identical to or different from one another, are substituents, e.g halogen atoms or hydrocarbon monovalent radicals each of which may, for example, contain from 1 to 20 carbon atoms. The aromatic compound preferably contains at least one benzene ring substituted with at least two hydroxy groups, of the general formula $Y_n C_6 H_{4-n}(OH)_2$ wherein the n groups Y may be, for example, alkyl, cycloalkyl or aryl groups, condensed or not with the benzene ring, or electronegative groups such as chlorine or another halogen. Y may be for example a methyl, ethyl, n-propyl, isopropyl, n-butyl, isobutyl or tert-butyl group; n is an integer having one of the values 0, 1, 2, 3 and 4. In the formula $R\,Al\,X_2$, R is a hydrocarbon monovalent radical containing, for example, from 1 to 20 carbon atoms, particularly an alkyl, cyclo-alkyl, aryl or aralkyl group, the methyl, ethyl, propyl and butyl groups being preferred; X is a halogen or another electronegative group, preferably chlorine or bromine.

The molar ratio of the hydroxyaromatic compound to $R\,Al\,X_2$ is selected higher than 0.1, preferably highest than 0.5. It is preferable not to exceed the ratio corresponding to the saturation of the medium with the hydroxyaromatic compound.

The present process of alkylation in the liquid phase of an aromatic hydrocarbon by means of an olefinic hydrocarbon can be conducted at a temperature in the range of from $-20$ to $200°\,C$, preferably from 10 to $100°\,C$ and under a pressure from 0.1 to 100 atmospheres. Generally the aluminum compound is used in an amount of $10^{-6}$ to 1 mole (per mole of aromatic hydrocarbon) and preferably of $10^{-4}$ to $10^{-2}$ mole per mole of aromatic hydrocarbon.

This soluble catalyst provides for the selective alkylation of an aromatic hydrocarbon by means of an olefin contained in a mixture of olefins having different reactivities. In order to selectively alkylate an olefin contained in a mixture of olefins, it is preferable to initiate the reaction in the presence of the olefin to be alkylated.

As examples of aluminum compounds which can be used according to this invention there will be mentioned dichloroethyl aluminum, dibromoethylaluminum, dichloro- or dibromo-n-propylaluminum, dichloro- or dibromo-n-butylaluminum, dichloro- or dibromo-isopropylaluminum, and dichloro- or dibromo-isobutylaluminum.

The term aluminum compound also includes the compounds formed in situ through convenient methods for producing the same, such as those corresponding to the following reactions :

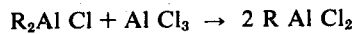

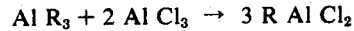

As examples of compounds containing at least one benzene ring substituted with at least two hydroxy groups, there will be mentioned, in the group of compounds containing a single benzene ring : pyrocatechol, resorcinol, hydroquinone and their substituted derivatives: 3,4 dihydroxytoluene, chloro or bromo catechols, chloro or bromo resorcinols, chloro or bromohydroquinones such as for example 4-chloro catechol, 4-chloro resorcinol, tetra chloro hydroquinone; in the group of polyphenols: pyrogallol, hydroxyquinol, phloroglucinol; in the group of compounds containing several benzene rings :1,3 dihydroxynaphthalene, 2,3-dihydroxynaphthalene and 1,3-dihydroxynaphthalene 5,7-disulfonic acid, 1,2-dihydroxy and 9,10-dihydroxyanthracenes, 1,2,10-trihydroxyanthracene, 3,4-dihydroxyphenanthrene.

The hydrocarbon subjected to alkylation may be an aromatic hydrocarbon containing at least one benzene ring of 6 carbon atoms. The aromatic hydrocarbons may contain from 1 to 6 benzene rings, either condensed or not or interlinked through saturated hydrocarbon chains containing, for example, from 1 to 10 carbon atoms. The aromatic rings may be unsubstituted or substituted with substituents, preferably hydrocarbon substituents. The preferred aromatic hydrocarbons contain from 1 to 3 benzene rings and from 0 to 4 saturated hydrocarbon substituents.

Generally the best results are obtained when the aromatic hydrocarbon has a single ring, e.g. benzene and its derivatives, substituted with saturated aliphatic groups. As examples of aromatic hydrocarbons are to be mentioned, in the group of those having a single ring : benzene, toluene, xylenes, ethylbenzene, cumene, pseudocumene, tetrahydronaphthalene; in the group of those having two rings : naphthalene, 1-methylnaphthalene, 1,8-diethylnaphthalene, biphenyl, 2,4,6-tributylbiphenyl, the diphenylalkanes in which the aromatic rings are interlinked through a saturated aliphatic chain, such as, for example, diphenylmethane, 1,3-diphenylbutane, 2,2-diphenylpropane; in the group of those having three rings : anthracene and its substituted derivatives, phenanthrene and its substituted derivatives.

The olefin used as alkylating agent is a monoolefinic hydrocarbon having from 2 to 20 carbon atoms per molecule.

It may be acyclic or cyclic and contain an internal or terminal double bond. As examples of olefins which can be used according to the invention, there will be mentioned : ethylene, propylene, 1-butene, 2-butenes, isobutylene, 1-pentene, isoamylene, 1-octene, 2,4,4-trimethyl-1-pentene, decenes, dodecenes, propylene tetramers or olefin mixtures such as, for example, the olefins obtained by cracking of paraffin waxes or the olefins obtained by catalytic dehydrogenation of paraffins. As examples of cyclic olefins there will be mentioned : cyclohexene, cyclopentene, cyclooctene and cyclododecene. The olefin may contain inert compounds as diluents, particularly saturated hydrocarbons such as methane, ethane, propane or other saturated hydrocarbons.

The aromatic hydrocarbon may be dissolved into an inert solvent such as hexane, isooctane, cyclohexane or decahydronaphthalene. The following examples, given only for illustrative purposes, must not be considered in any way as a limitation of the scope of the invention.

EXAMPLE 1

Into a glass reactor, preliminarily made free from air and moisture and thereafter maintained under an atmosphere of propylene dried over molecular sieve, there are introduced, at 40° C, 20 ml of benzene, distilled on sodium and having a water content less than 10 ppm, which benzene is saturated with propylene under atmospheric pressure, and 0.1 ml of a 50 percent by weight solution of dichloroethylaluminum in hexane (i.e., 3.4. $10^{-4}$ mole of dichloroethylaluminum).

The propylene absorption under stirring is low since, after one hour, only 0.5 g of propylene were absorbed.

EXAMPLE 2

To the preceding reaction mixture are added 2.5 ml of a solution of pyrocatechol in benzene (i.e 3.35. $10^{-4}$ mole of pyrocatechol). A very quick propylene absorption is observed. After about 10 minutes 21 g of propylene were absorbed. By chromatography analysis in the vapor phase, the reaction mixture was found to have the following composition :

|  | % mole |
|---|---|
| Benzene | 15.1 |
| Cumene | 14.6 |
| Diisopropylbenzene | 19.6 |
| Triisopropylbenzene | 35.7 |
| Tetraisopropylbenzene | 15.0 |

EXAMPLE 3

Into a glass reactor, preliminarily made free from air and moisture and thereafter maintained under an atmosphere of propylene dried over molecular sieve, there are introduced, at 40° C, 40 ml of benzene having a water content less than 10 ppm and containing 3.2. $10^{-4}$ mole of hydroquinone. To this solution, after saturation with propylene under atmospheric pressure, is added 0.1 ml of a 50 percent by weight solution of dichloroethylaluminum in hexane. The propylene is very quickly absorbed under atmospheric pressure after a relatively short induction period. In about ten minutes, 30.4 g of propylene were absorbed. The composition of the reaction mixture is as follows :

|  | % mole |
|---|---|
| Benzene | 32.9 |
| Cumene | 24.0 |
| Diisopropylbenzene | 13.1 |
| Triisopropylbenzene | 9.5 |
| Tetraisopropylbenzene | 20.5 |

EXAMPLES 4, 5 and 6

Into a reactor, preliminarily made free from air and moisture and thereafter maintained under an atmosphere of propylene dried over molecular sieve, there are introduced, at 40° C, 200 ml of benzene having a water content less than 10 ppm and containing resorcinol in variable amounts according to the test.

The solution is saturated with propylene under atmospheric pressure. There is then introduced 1 ml of a 50 percent solution of dichloroethylaluminum in hexane. The reaction product has been subjected to chromatography analysis in the vapor phase. The results of these tests are given in the following table :

| Number of Test | Resorcinol AlEtCl₂ molar | Reaction, time, min. | Alkylated propylene, g. | Analysis, percent mole ||||
|---|---|---|---|---|---|---|---|---|
|  |  |  |  | Benzene | Cumene | Diisopropylbenzene | Triisopropylbenzene | Tetraisopropylbenzene |
| 4 | 0.5 | 70 | 36 | 80.5 | 11.1 | 2.2 | 2.2 | 4.0 |
| 5 | 0.9 | 40 | 171 | 22.8 | 26.3 | 18.4 | 12.1 | 20.4 |
| 6 | 1.3 | 150 | 46 | 72.8 | 14.8 | 4.4 | 3.8 | 4.2 |

EXAMPLES 7 and 8

A set of two tests as in the preceding example is repeated with tetrachlorohydroquinone replacing resorcinol.

The results are reported in the following table :

| Number of test | Tetrachlorohydroquinone AlEtCl₂ molar | Reaction time, min. | Alkylated propylene, g. | Analysis, percent mole ||||
|---|---|---|---|---|---|---|---|---|
|  |  |  |  | Benzene | Cumene | Diisopropylbenzene | Triisopropylbenzene | Tetraisopropylbenzene |
| 7 | 0.5 | 70 | 34 | 82 | 10.2 | 1.9 | 1.8 | 4.1 |
| 8 | 0.96 | −18 | 152 | 24.8 | 25.5 | 22.6 | 18.1 | 9.0 |
|  |  | −180 | 231 | 10.9 | 15.0 | 22.5 | 22.4 | 29.4 |

EXAMPLES 9 and 10

Into a reactor preliminarily made free from air and moisture, there are introduced 50 ml of benzene having a water content less than 10 ppm, 93 mg of tetrachlorohydroquinone and 11 g of 1-dodecene. To the solution, maintained at a different temperature in each test, is then added 0.05 ml of a 50 percent solution of dichloroethylaluminum in hexane (i.e. $1.7.10^{-4}$ mole of dichloroethylaluminum). The composition of the reaction mixture is determined by chromatography in the vapor phase.

The results are given in the following table:

| N° of test | Reaction temperature °C | Reaction time mn | Dodecene conversion % | Monododecyl-benzenes g |
|---|---|---|---|---|
| 9 | 25 | 45 | 97 | 8.8 |
| 10 | 70 | 6 | 98.5 | 12.1 |

EXAMPLE 11

Into a glass reactor, preliminarily made free from air and moisture and thereafter maintained under an atmosphere of propylene dried over molecular sieve, there are introduced, at 40° C, 20 ml of metaxylene. To this solution, after saturation thereof with propylene under atmospheric pressure, there is added 0.1 ml of a 50 percent by weight solution of dichloroethylaluminum in hexane (i.e., $3.4.10^{-4}$ mole of dichloroethylaluminum). There are also added to the reaction mixture 2.5 ml of a pyrocatechol solution containing $3.35.10^{-4}$ mole of pyrocatechol. After about 9 minutes 9 grams of propylene were absorbed.

The reaction mixture contains metaxylene and tetraalkylbenzenes, particularly 1,5-diisopropyl-2,4-dimethyl benzene.

EXAMPLE 12

Example 11 is repeated except that dichloroethylaluminum is replaced by dibromoisopropylaluminum and the pyrocatechol is replaced by pyrogallol. The results are substantially the same as in example 11.

EXAMPLE 13

Example 11 is repeated except that dichloroethylaluminum is replaced by dichloro-n-butylaluminum and pyrocatechol by 1,3-dihydroxynaphthalene. The results are substantially the same as in example 11.

EXAMPLES 14 to 20

Example 11 is repeated except that pyrocatechol is replaced successively by: 3,4-dihydroxytoluene, 4-chloro catechol, tetrachlorohydroquinone, hydroxyquinol, 1,3-dihydroxynaphthalene-5,7-disulfonic acid, 1,2,10-trihydroxyanthracene and 3,4-dihydroxyphenanthrene.

The results are substantially the same as in example 11.

EXAMPLES 21 to 23

Example 2 is repeated except that dichloroethylaluminum is successively replaced by dibromoethylaluminum, dichloro-n-propylaluminum and dibromo isobutylaluminum. The results are substantially the same as in example 2.

EXAMPLES 24 to 32

Into a glass reactor, preliminarily made free from air and moisture and thereafter maintained under an atmosphere of propylene dried over molecular sieve, there are introduced, at 40° C, 20 ml of toluene in example 24, of ethylbenzene in example 25, of cumene in example 26, of tetrahydronaphthalene in example 27, of naphthalene in example 28, of 1,8-diethylnaphthalene in example 29, of diphenylmethane in example 30, of 2,2-diphenylpropane in example 31 and of phenanthrene in example 32. To this solution, after saturation thereof with propylene under atmospheric pressure, there is added 0.1 ml of a 50 percent by weight solution of dichloroethylaluminum in hexane (i.e., $3.4.10^{-4}$ mole of dichloroethylaluminum). There are then added 2.5 ml of resorcinol solution ($3.35.10^{-4}$ mole of resorcinol). In all cases a quick absorption of propylene is observed.

What we claim is:

1. A catalyst consisting essentially of a substantially anhydrous mixture of at least one compound of the formula R Al $X_2$, in which R is a monovalent hydrocarbon radical and X is halogen, with at least one polyhydroxyaromatic compound, the molar ratio of the polyhydroxyaromatic compound to R Al $_x$ being at least 0.1.

2. A catalyst according to claim 1 wherein the polyhydroxyaromatic compound is of the formula $(R')_m Ar(OH)_x$ in which x is an integer greater than 1, m is zero or an integer, the sum (x + m) is at most equal to the maximum valency of Ar, Ar is an aromatic radical of valency (x + m) and the m groups R' are halogen atoms or hydrocarbon monovalent radicals.

3. A catalyst according to claim 2 wherein the polyhydroxyaromatic compound is the formula $Y_n C_6 H_{4-n}(OH)_2$, Y being an alkyl, cycloalkyl or aryl group or a halogen atom, and n is an integer of 0 to 4 inclusive.

4. A catalyst according to claim 2, wherein the molar ratio of the polyhydroxyaromatic compound to the compound R Al $X_2$ is from 0.5 to the saturation ratio.

5. A catalyst according to claim 1, comprising a dihydroxybenzene and a dichloroalkylaluminum.

* * * * *

UNITED STATES PATENT OFFICE
CERTIFICATE OF CORRECTION

Patent No. 3,773,689     Dated November 20, 1973

Inventor(s) Bernard Torck, et al.

It is certified that error appears in the above-identified patent and that said Letters Patent are hereby corrected as shown below:

IN THE CLAIMS:

CLAIM 1, COLUMN 6, LINE 6 OF THE CLAIM:

"$R\ Al_x$" should read -- $R\ Al\ X_2$ --.

Signed and sealed this 16th day of April 1974.

(SEAL)
Attest:

EDWARD M. FLETCHER, JR.
Attesting Officer

C. MARSHALL DANN
Commissioner of Patents